(12) United States Patent
Benítez Manzano

(10) Patent No.: US 6,976,446 B2
(45) Date of Patent: Dec. 20, 2005

(54) ADJUSTABLE SAFETY DISTANCE SPACER FOR BICYCLES

(76) Inventor: Diego Benítez Manzano, C/Silva No. 2, Arucas, Las Palmas de Gran Canaria (ES) E-35412

(*) Notice: Subject to any disclaimer, the term of this patent is extended or adjusted under 35 U.S.C. 154(b) by 0 days.

(21) Appl. No.: 10/518,250

(22) PCT Filed: Jul. 3, 2003

(86) PCT No.: PCT/ES03/00332

§ 371 (c)(1),
(2), (4) Date: Dec. 16, 2004

(87) PCT Pub. No.: WO2004/005121

PCT Pub. Date: Jan. 15, 2004

(65) Prior Publication Data

US 2005/0211152 A1  Sep. 29, 2005

(30) Foreign Application Priority Data

Jul. 9, 2002  (ES) ............... P200201676

(51) Int. Cl.$^7$ ................................. B60Q 1/26
(52) U.S. Cl. ....................... 116/35 R; 116/50
(58) Field of Search ............. 116/28 R, 30, 35 R, 116/41, 42, 44, 46, 50, 35 A, 28 A, 173, 174; 33/264; 224/425, 426

(56) References Cited

U.S. PATENT DOCUMENTS

| | | | | |
|---|---|---|---|---|
| 1,274,309 A | * | 7/1918 | De Witte | ............... 116/41 |
| 1,697,411 A | * | 1/1929 | Brandenburg | ............... 116/44 |
| 2,586,643 A | | 2/1952 | Garlow | |
| 3,788,268 A | * | 1/1974 | Hiatt et al. | ............... 116/28 R |
| 3,945,336 A | | 3/1976 | Harris | |
| 3,967,575 A | * | 7/1976 | Coutts | ............... 116/35 A |
| 3,972,302 A | * | 8/1976 | Sherman | ............... 116/28 R |
| 3,982,771 A | * | 9/1976 | Tropeano | ............... 280/288.4 |
| 4,038,935 A | | 8/1977 | Margiloff | |
| 4,103,924 A | * | 8/1978 | Suhm | ............... 280/288.4 |
| 4,116,154 A | * | 9/1978 | Harris | ............... 116/35 A |
| 4,342,280 A | | 8/1982 | Ashworth | |
| 4,575,189 A | * | 3/1986 | Johnson | ............... 359/526 |
| 4,586,454 A | | 5/1986 | Hedquist et al. | |

(Continued)

FOREIGN PATENT DOCUMENTS

DE  296 09 065  8/1996

(Continued)

OTHER PUBLICATIONS

Derwent Abstract of DE 29711742 U1, Nov. 5, 1998.*

Primary Examiner—R. Alexander Smith
(74) Attorney, Agent, or Firm—Richard M. Goldberg

(57) ABSTRACT

The invention relates to an adjustable safety distance spacer for bicycles, comprising two guide tubes (1, 2), a spacer rod (5) which moves inside the aforementioned guide tubes and which passes through perforated plugs (9), a refracting rotor comprising four curved blades (7) and a circumferential protector (6) which is disposed at one of the ends of the spacer rod and which is solidly connected to said rod by means of a safety clevis (8), and two supports (3, 4) which are used to fix the guide tubes (1, 2) to the bicycle frame (10). In this way, the cyclist can adjust the size of a safety signal strip quickly, comfortably and safely using just one hand when he/she is being overtaken by another vehicle, thereby preventing the cyclist from being hit owing to the incompetency or carelessness of the driver of the overtaking vehicle.

3 Claims, 18 Drawing Sheets

U.S. PATENT DOCUMENTS

| | | | |
|---|---|---|---|
| 4,747,664 A | | 5/1988 | Slaughter |
| 5,014,641 A | * | 5/1991 | Johnson .................... 116/28 R |
| 5,113,588 A | * | 5/1992 | Walston ........................ 33/264 |
| 5,418,696 A | * | 5/1995 | Izzo, Sr. ...................... 362/473 |
| 6,065,423 A | * | 5/2000 | Hensel ..................... 116/35 R |

FOREIGN PATENT DOCUMENTS

| | | | | |
|---|---|---|---|---|
| DE | 29714814 U1 | * | 12/1997 | ............. B62J 6/00 |
| EP | 505182 A1 | * | 9/1992 | ............. B62J 6/00 |
| ES | 1 027 262 | | 7/1994 | |

* cited by examiner

SCALE 1:4

Scale 1:3

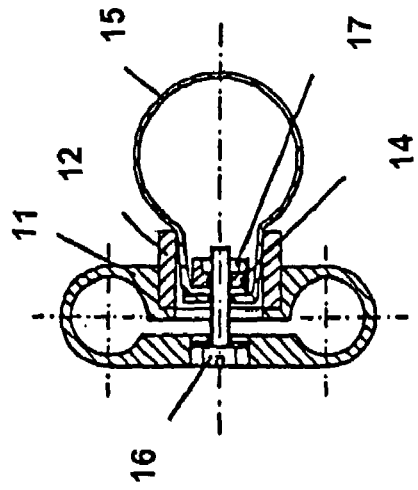
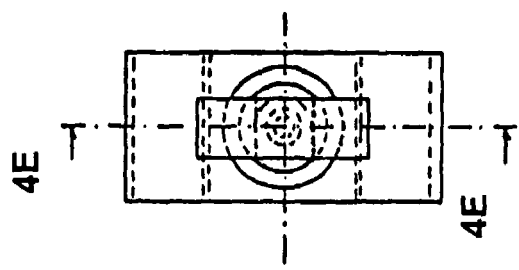
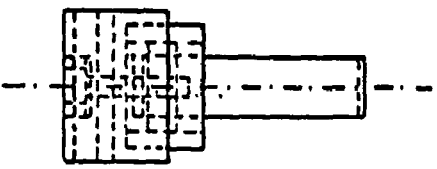
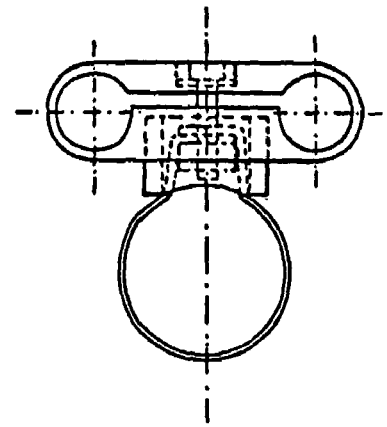
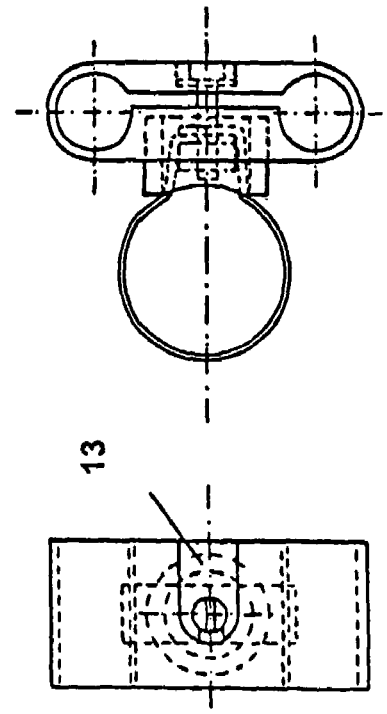

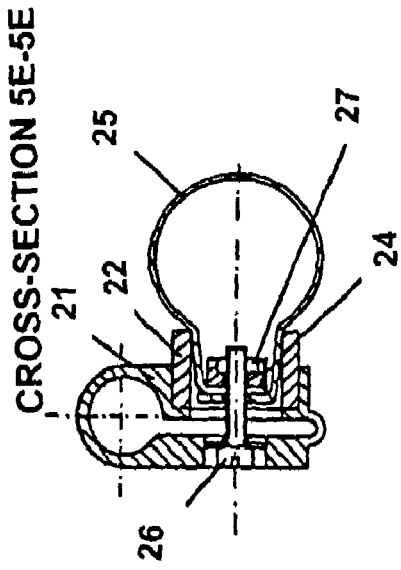
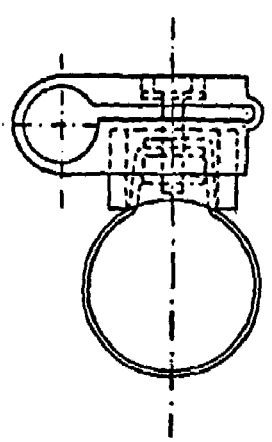
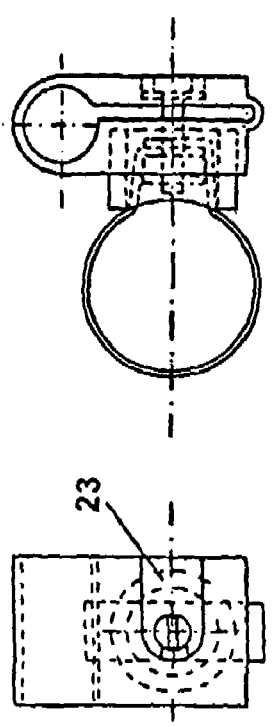
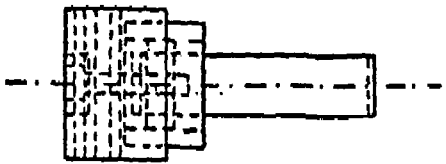
FIG. 5A  FIG. 5B  FIG. 5C  FIG. 5E
FIG. 5D
SCALE 1:1,5

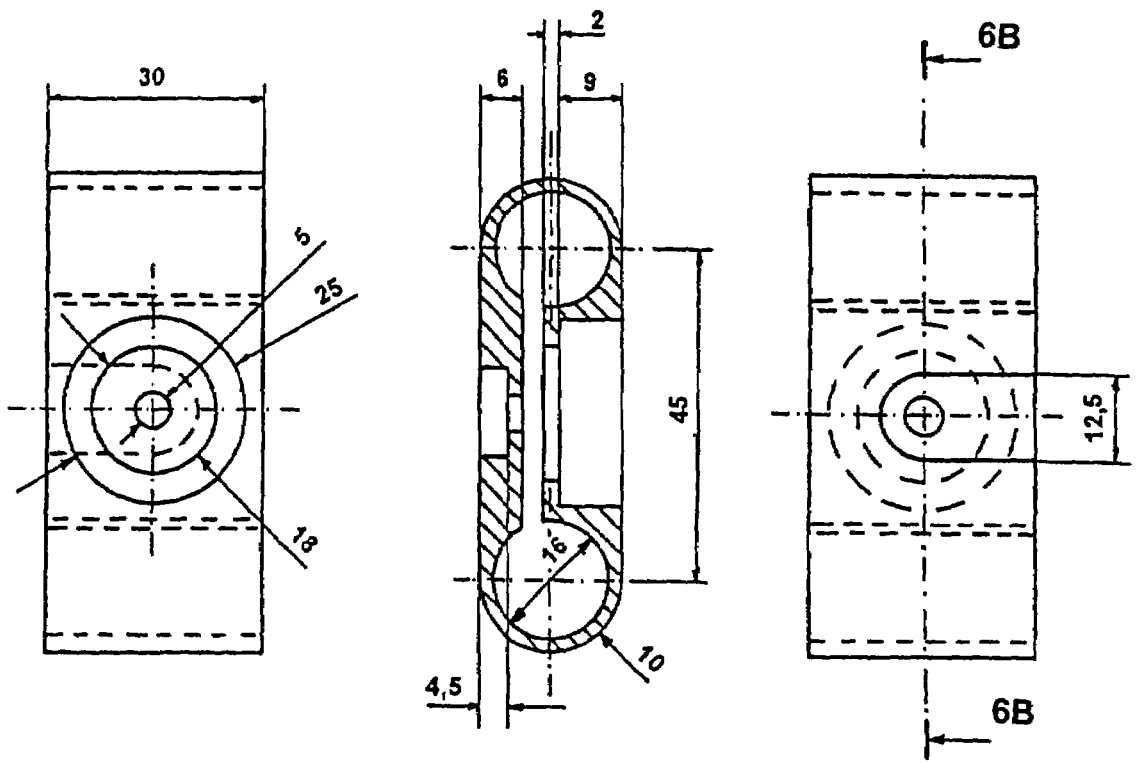
SCALE 1:1

SCALE 1:1

FIG. 8A
FIG. 8B
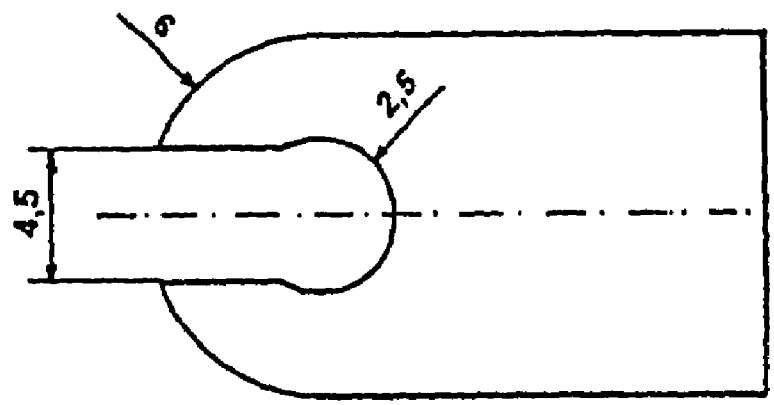
SCALE 3:1

SCALE 2:1

SCALE 1:1

FIG. 11A
FIG. 11B
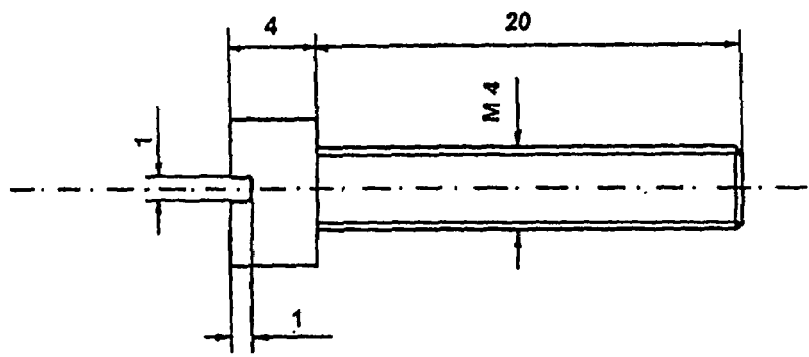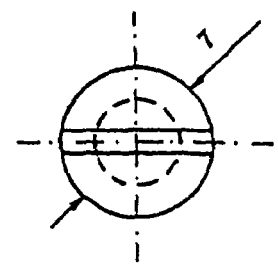
FIG. 11C
FIG. 11D
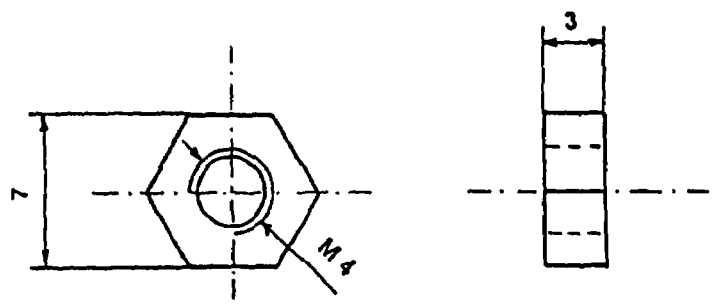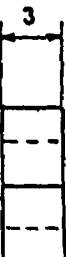
SCALE 3:1

FIG. 12C  CROSS-SECTION 12B-12B  FIG. 12A

SCALE 1:1

FIG. 13B
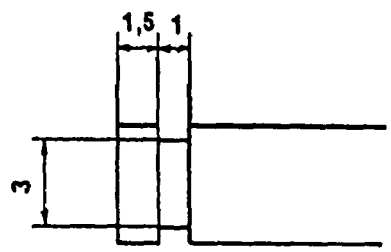
DETAIL 13B
SCALE 4:1
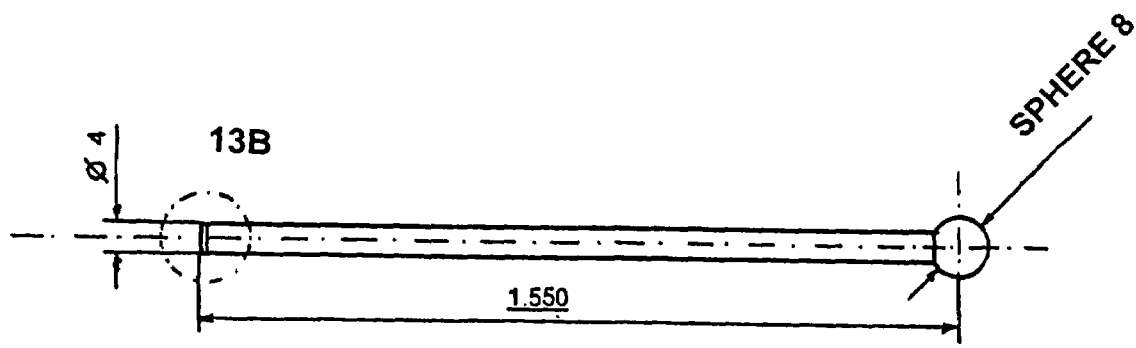
FIG. 13A
SCALE 1:1

SCALE 1:1

SCALE 1:1

SCALE 6:1

SCALE 2:1

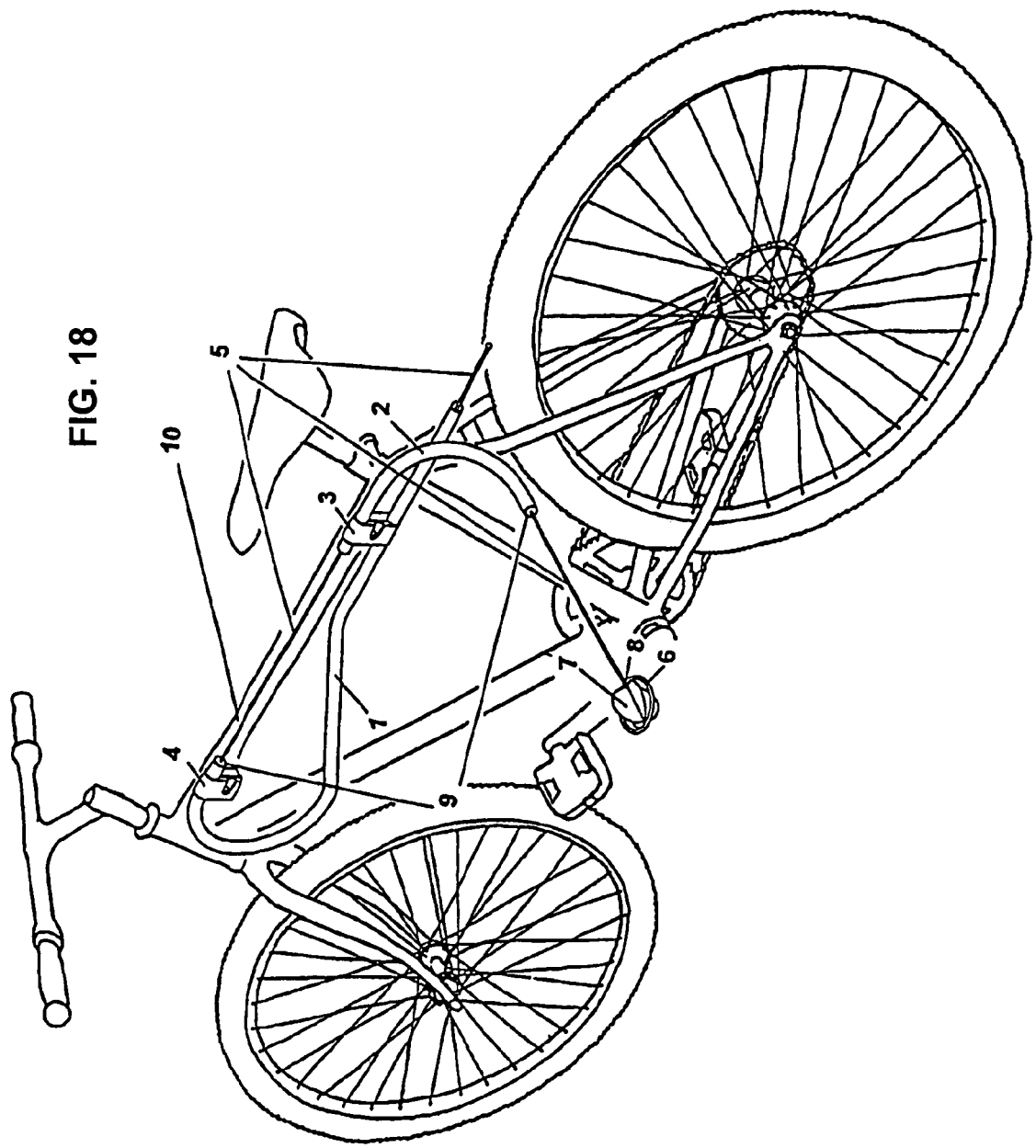

ADJUSTABLE SAFETY DISTANCE SPACER FOR BICYCLES

OBJECT OF INVENTION

The present invention relates to an adjustable safety distance spacer for bicycles which is fastened by supports to the bicycle frame. It allows the cyclist to signpost with any of the two hands, in a fast, comfortable and safe way, the situation of the minimal distance of security when he is overtaken by another vehicle. This distance depends on the characteristics of the road surface, thus it guarantees that there is no collision caused by incompetence or carelessness of the drivers when they overtake, establishing a strip of security between the lateral border of the cyclist and the one of the vehicle that overtakes.

BACKGROUND OF INVENTION

The distancers that we have known until now are fixed, are not able to include the whole of the minimal distances shown in the present-day Traffic Law. This distance of 1.5 meters, is lateral, and is not adjustable when we want to signpost, so the use of the distances present a great inconvenience since they cannot be adapted to the constant changes of the traffic and road surfaces, with the resulting risk to cause impact against another vehicle, pedestrian or static objects, risking the stability of the bicycle and the cyclist's security.

Those functional and utilization deficiencies don't exist in the present invention which is totally innovative for its forms, way of use and effectiveness when we want to safeguard the security of the cyclist who is overtaken by another vehicle. This gadget allows to regulate the distance of security which goes from 0 meters to 1.5 meters, its movable elements refract the light and allow to detect the presence of the cyclist on the road, even during the night, increasing the security.

DESCRIPTION OF THE INVENTION

The adjustable safety distance spacer for bicycles is an accessory to install in any kind of bicycles, since it can be adapted to the different frames. Its placing does not get in the way to maneuverability and therefore in the security when using the bike. It can also be used in wheelchairs.

The adjustable safety distance spacer is formed by two guide tubes which are joined to the bicycle frame by two supports. These supports are adapted to all the frames found in the market. A thin spacer rod is placed inside the guide tubes. Its flexibility makes possible to adapt it to the forms of the tubes. This stick goes through the perforated plugs, which are placed at both ends of the guide tubes.

In one of the ends of the thin spacer rod a refracting rotor is situated. This is formed by four curved blades which spin on its own axle when the air drafts get in. This refracting rotor allows to reflect the light received by other vehicles and this helps to signpost the distance of security during the night.

Around the refracting rotor there is an antihooking protector, in a circumference form, which prevents the rotor from getting hooked with those possible objects that accidentally may be touched on the way, such as, branches, posts or even vehicles.

The aforementioned protector is fastened to the spacer rod by means of a hairpin which provides safety.

When the thin spacer rod comes out of the guide tube, at the end, where is situated the refracting rotor with his protector, this one, by the form that the guide tube has, it becomes situated in a perpendicular plane to the plane that it contains the bicycle. The spacer rod can also be used as a support for other elements such as sidelights. At the end of the thin spacer rod there is a little sphere which makes easy the advance of the extreme of this stick in the inside of the guide tube.

SHORT DESCRIPTION OF THE DRAWINGS

For a better understanding of the all described elements in the present memory, some drawings are included. It represents a practical case of realization of the adjustable safety distance spacer for bicycles.

In these drawings, the FIG. 1 is a general perspective of an assembled group, where the guide tube -1- and the guide tube -2- are fastened to the bicycle frame by means of the double support -3- and of the simple support -4-. Inside the guide tube -1- and the guide tube -2-, pass the thin spacer rod -5- crossing two perforated plugs -9-. The thin spacer rod -5- contains the rotor -7- in one of its extremes which is protected by the antihooking -6-, which is linked with the thin spacer rod by means of a safety hairpin -8-.

Figure 1:
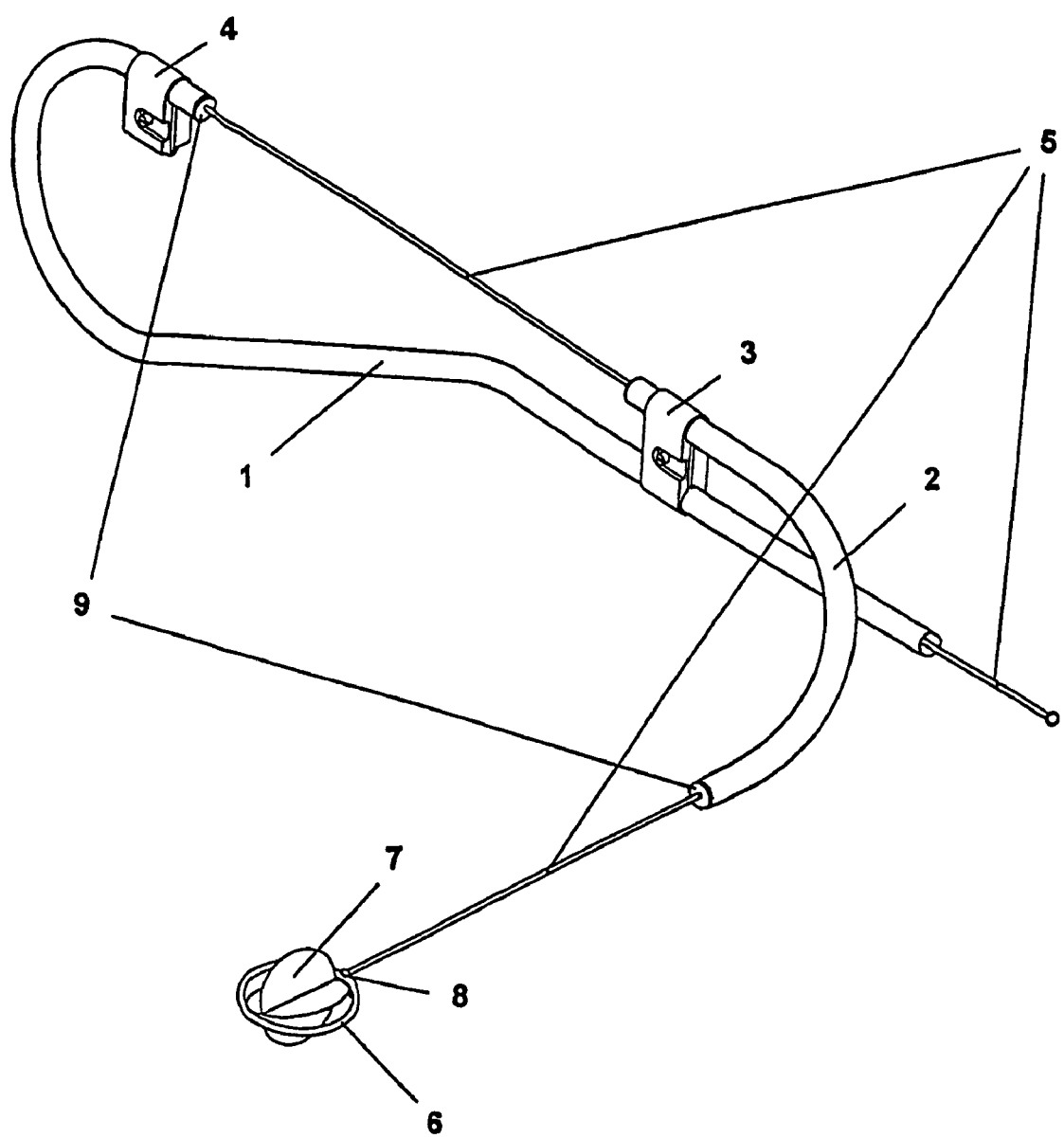

FIGS. 4A–4E show the right side elevational view, the front elevational view, the left side elevational view, the top plan view and the cross-sectional view of FIG. 4C taken along line 4E—4E thereof, respectively, of the Double Support -3- of FIG. 1, where -11- is the Body of the Support, -12- is The Distancer, -13- is the Uncovered Washer, -14- is the Tightener, -15- is the Belt in charge of embracing the tube of the bicycle frame, -16- is the Screw and -17- is the Screw Nut.

FIGS. 5A–5E show the right side elevational view, the front elevational view, the left side elevational view, the top plan view and the cross-sectional view of FIG. 5C taken along line 5E—5E thereof, respectively, of the Support Simple -4-, of FIG. 1, where -21- is the Body of the Support, -22- is the Distancer, -23- is the Uncovered Washer, -24- is the Tightener, -25- is the Belt, -26- is the Screw and -27- is the Screw Nut.

FIGS. 6A–6C show the right side elevational view, the cross-sectional view of FIG. 6A taken along line 6B—6B and the left side elevational view, respectively of the Body of the Support -11- of FIG. 4.

Figures 7A, 7B:
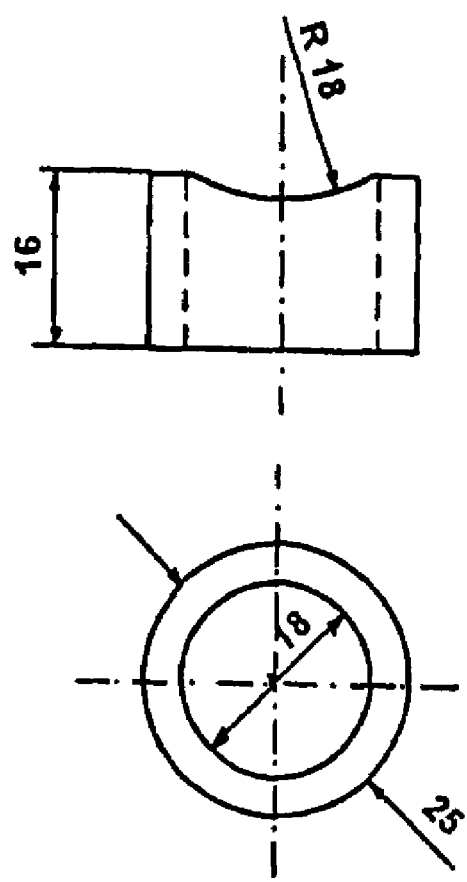

FIGS. 7A and 7B shows the front elevational view and the plan view of the Distancer -22- of FIGS. 5 and 12.

FIGS. 8A and 8B show the front elevational view and the side elevational view of the Uncovered Washer -23- of FIGS. 5 and 12.

Figure 9A:
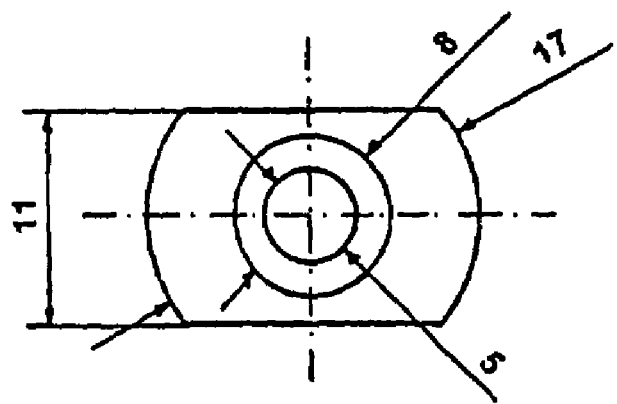
Figure 9B:
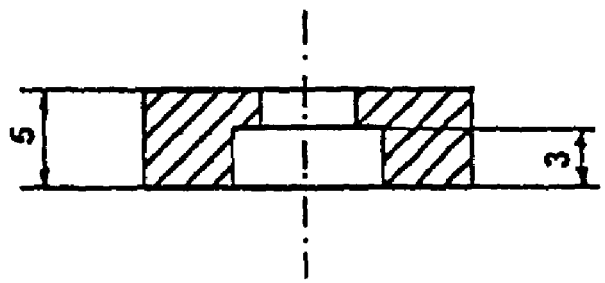

FIGS. 9A and 9B show the front elevational view and the cross-sectional view of the Tightener -24- of FIGS. 5 and 12.

Figures 10A, 10B:
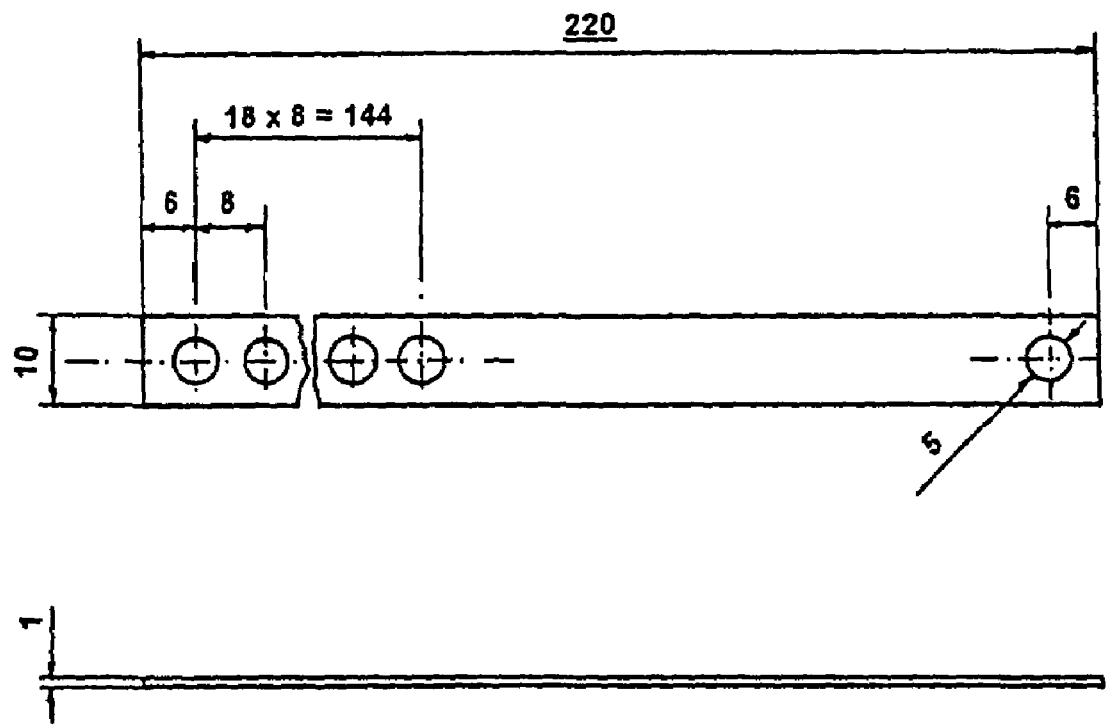

FIGS. 10A and 10B show the plan view and the edge view of the Belt -25-, as extended, of FIGS. 5 and 12.

FIGS. 11A and 11B show the side elevational view and the front elevational view, respectively, of the Screw -26- and FIGS. 11C and 11D show the plan view and side elevational view, respectively, of the Screw Nut -27- of FIGS. 5 and 12.

Figure 12B:
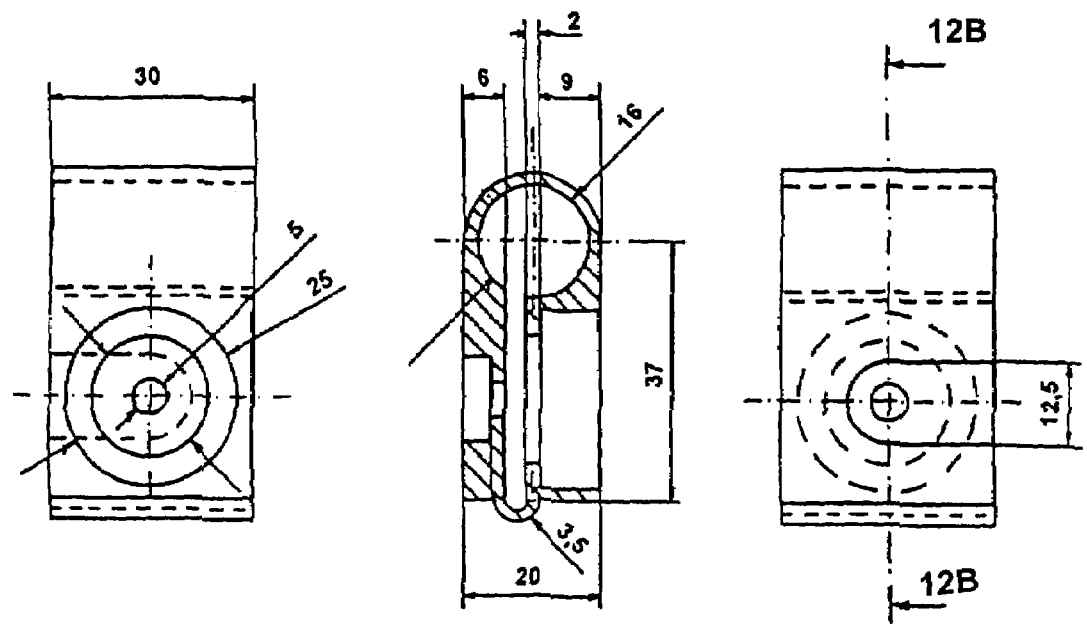

FIGS. 12A–12C show the front right side elevational view, the cross-sectional view of FIG. 12A taken along line 12B—12B and the left side elevational view, respectively, of the Body of the Support -21- of FIG. 5.

FIGS. 13A and 13B show the side elevational view and the enlarged side elevational view taken along detail 13B of FIG. 13A, respectively, of the Thin Spacer Rod -5- of FIG. 1.

Figure 14C:
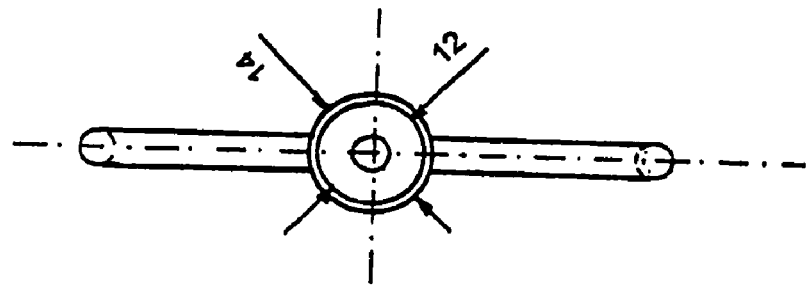
Figure 14B:
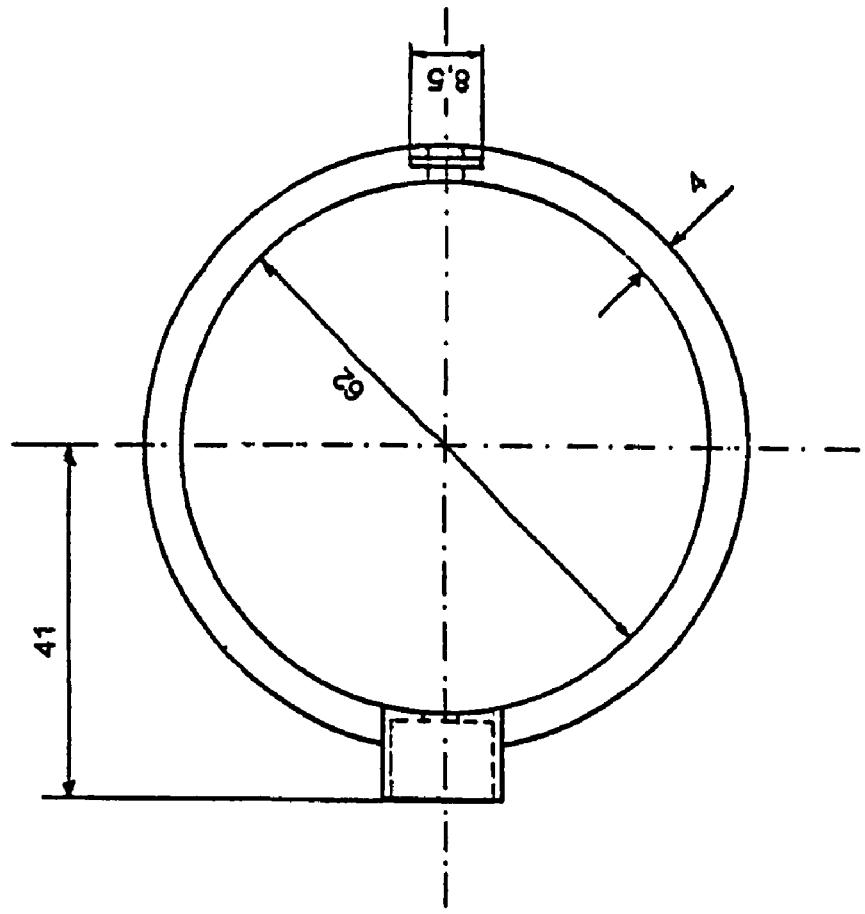
Figure 14A:
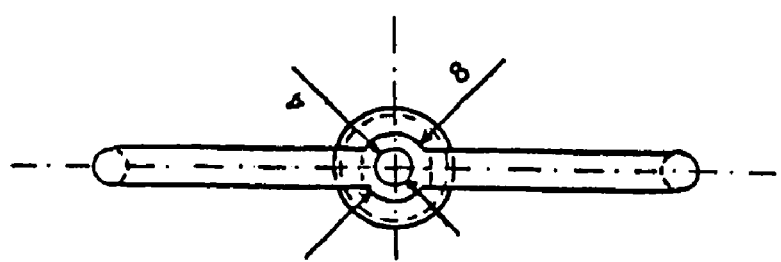

FIGS. 14A–14C show one side elevational view, the top plan view and the other side elevational view of the Antihooking Protector of the Rotor -6- of FIG. 1.

Figure 15A:
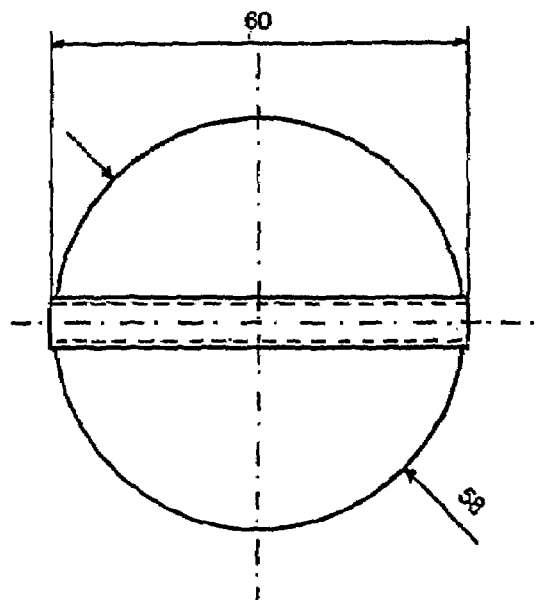
Figure 15B:
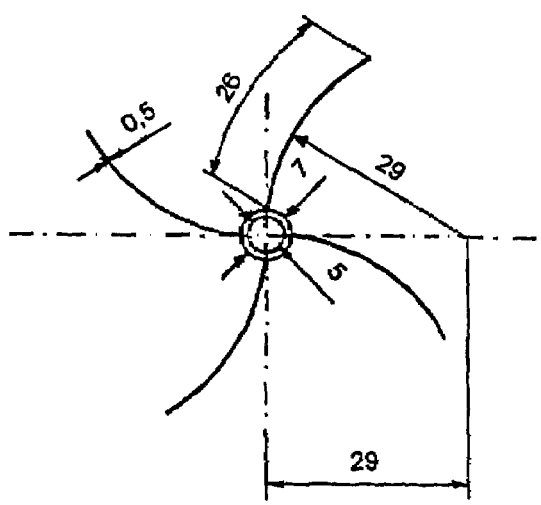

FIGS. 15A and 15B show the front elevational view and the side elevational view of the Refracting Rotor -7- of FIG. 1.

Figure 16B:
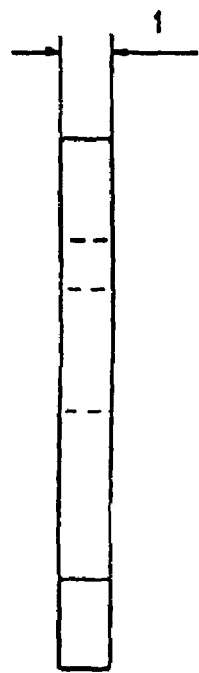
Figure 16A:
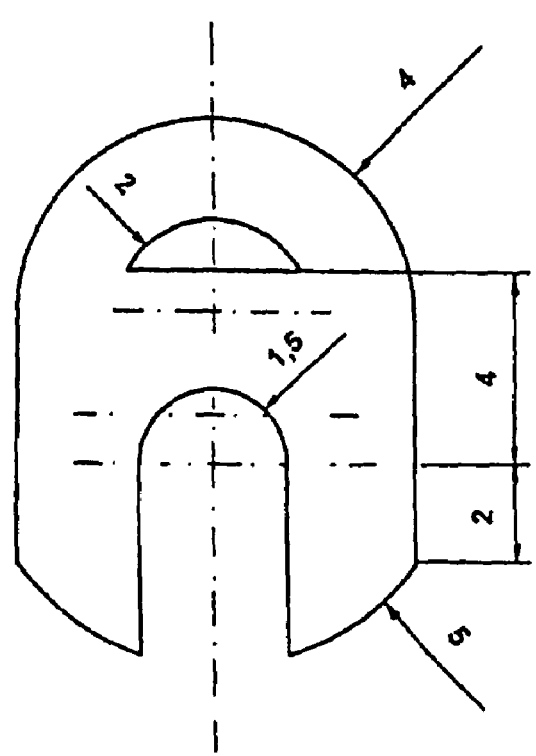

FIGS. 16A and 16B show the front elevational view and the side elevational view of the Protector -8- of FIG. 1.

Figure 17A:
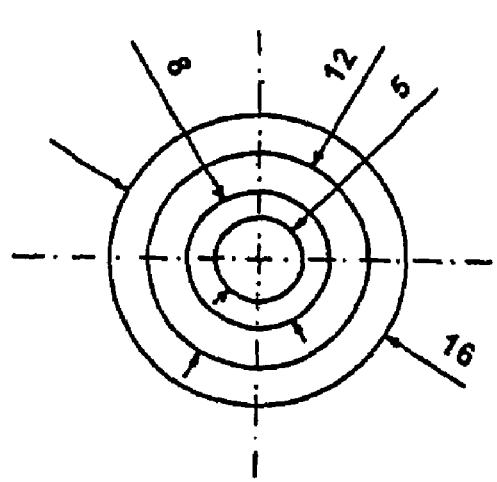
Figure 17B:
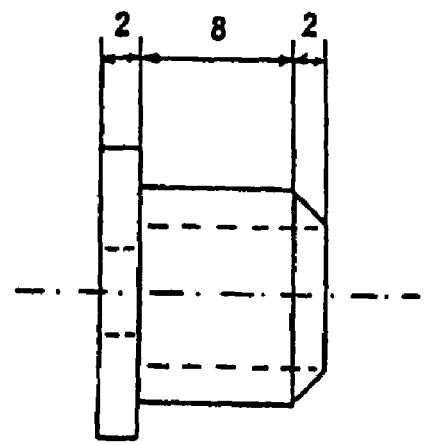

FIGS. 17A and 17B show the front elevational view and the side elevational view of the Perforated plug -9- of FIG. 1.

FIG. 18 is a general perspective of an assembled group, where the guide tube -1- and the guide tube -2- are fastened to the bicycle frame -10- by means of the double support 3- and of the simple support -4-. Inside the guide tube -1- and the guide tube -2- pass the thin spacer rod -5- crossing through two perforated plugs -9-. This spacer rod -5- contains the rotor -7- in one of its extremes which is protected by the antihooking -6-, which is connected with the thin spacer rod 5 by means of a safe in the form of hairpin -8-.

DESCRIPTION OF PREFERRED REALIZATION

The adjustable distancer of security for bicycles (FIG. 1) is composed of the pieces -1-, -2-, -3-, -4-, -5-, -6-, -7-, -8- and -9-.

Figure 2B:
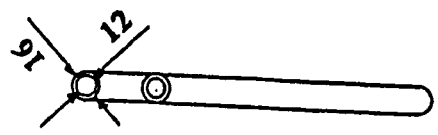
FIGS. 2A and 2B show the front view and the side view of the Tube Guide -1- of the FIG. 1.
Figure 2A:
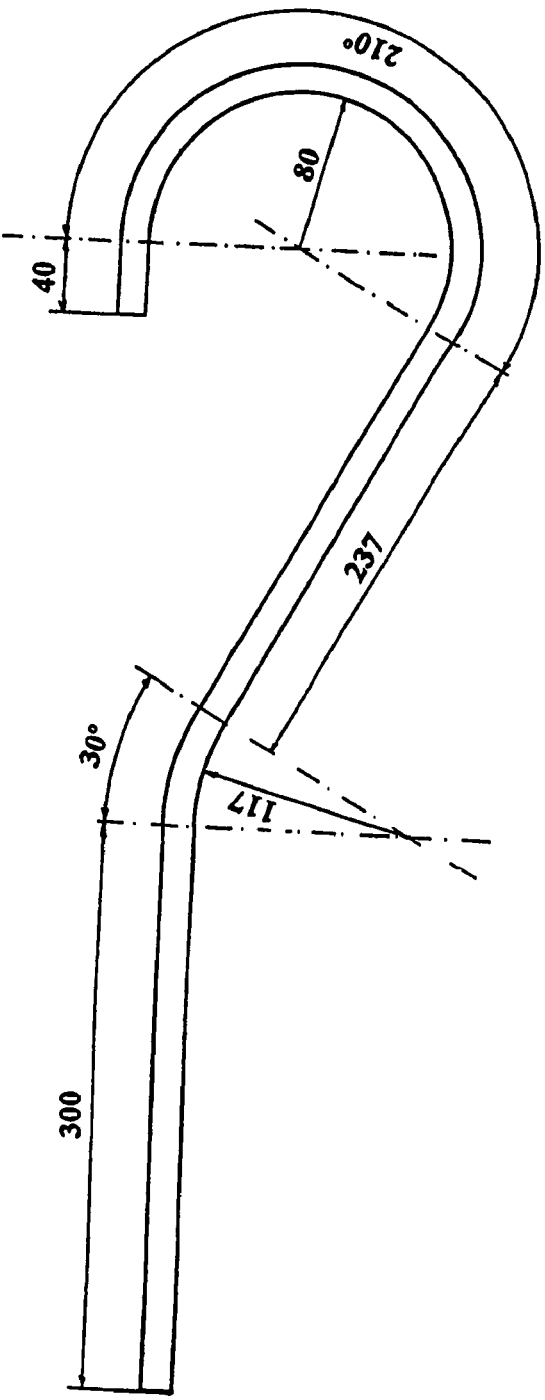

Piece -1- (FIG. 1) of plastic material, is a tube and has the shape and dimensions as shown in FIG. 2.

Figure 3A:
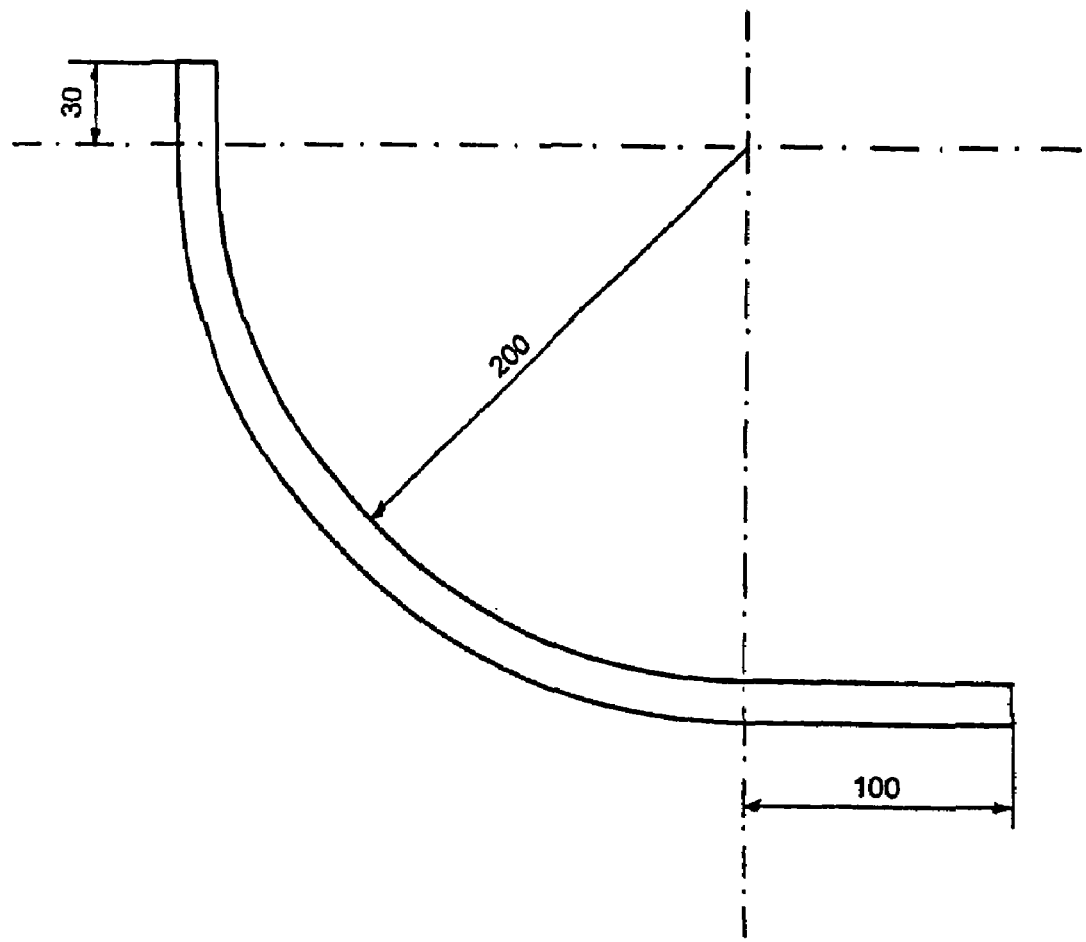
FIGS. 3A and 3B show the front view and the plan view of the Tube Guide -2- of the FIG. 1.
Figure 3B:
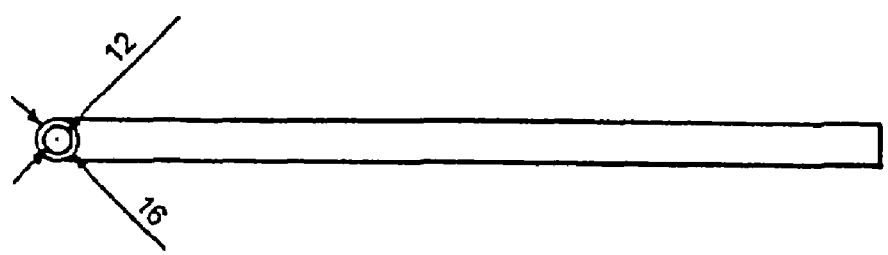

Piece -2- (FIG. 1) of plastic material, is a tube and has the shape and dimensions as shown in FIG. 3.

Piece -3- (FIG. 1) is a support for two tubes and has the shape and dimensions as shown in detail in FIGS. 4, 6, 7, 8, 9, 10 and 11. The pieces of FIGS. 6, 7, 8, 9 and 10, are plastic material, while the pieces of the FIG. 11 are made of steel or aluminium.

Piece -4- (FIG. 1) is a tube support and has the shape and dimensions as shown in detail in FIGS. 5, 7, 8, 9, 10, 11 and 12. The pieces of FIGS. 7, 8, 9, 10 and 12, are of plastic material, while the pieces of FIG. 11 are made of steel or aluminium.

Piece -5- (FIG. 1) of carbon fibre, is a thin rod and has the shape and dimensions as shown in detail in FIG. 13.

Piece -6- (FIG. 1) of plastic material, has a hoop form and has the shape and dimensions as shown in detail in FIG. 14.

Piece -7- (FIG. 1) of plastic material, is a rotor with four shovels, which is painted with a refracting paint, and has the shape and dimensions as shown in detail in FIG. 15.

Piece -8- (FIG. 1) of plastic material, is a safety element with a hairpin shape and has the shape and dimensions as shown in detail in FIG. 16.

Piece -9- (FIG. 1) of plastic material, is a perforated cork and has the shape and dimensions as shown in detail in FIG. 17.

From the description and by the observation of the drawings, we can appreciate how innovative the adjustable distancer of security for bicycles is (FIG. 18), which is joined to the frame -10- of the bicycle by means of the supports -3- and -4- permitting the cyclist to fasten with a hand the thin spacer rod -5-, in the space comprised between supports -3- and -4-, moving it forwards or backwards, decreasing or increasing the distance of security of the cyclist, in a fast and effective form.

The materials used in the manufacture, forms and dimensions will be independent from the invention's object, as long as they do not affect its essence.

INDUSTRIAL APPLICATION

The dimensions, forms and materials used in the adjustable safety distance spacer for bicycles, allow to be manufactured at the present time by any industry dedicated to the moulding and assembling of plastic pieces.

What is claimed is:

1. Adjustable safety distance spacer for bicycles, comprised of:
   two tube guides,
   a thin spacer rod which extends inside of the guide tubes,
   a refracting rotor with a protector situated at one end of the thin spacer rod, and
   two supports which are adapted to fix the guide tubes to a bicycle frame of the bicycle.

2. Adjustable safety distance spacer for bicycles, according to the claim 1, wherein the thin spacer rod, which extends inside the guide tubes, and which exits out of one said guide tube will be situated in a direction perpendicular to a plane surface that contains the bicycle frame and the refracting rotor is situated at said end of the thin spacer rod.

3. Adjustable safety distance spacer for bicycles, according to the claim 1, wherein the rotor has four curved blades which refract light, and the protector in the shape of a circle, is fastened to said one end of the thin spacer rod by a safety element in a shape of a hairpin.

* * * * *